Oct. 31, 1939.                W. L. SCOTT                2,177,790
                            EDUCATIONAL GAME
                          Filed July 29, 1938
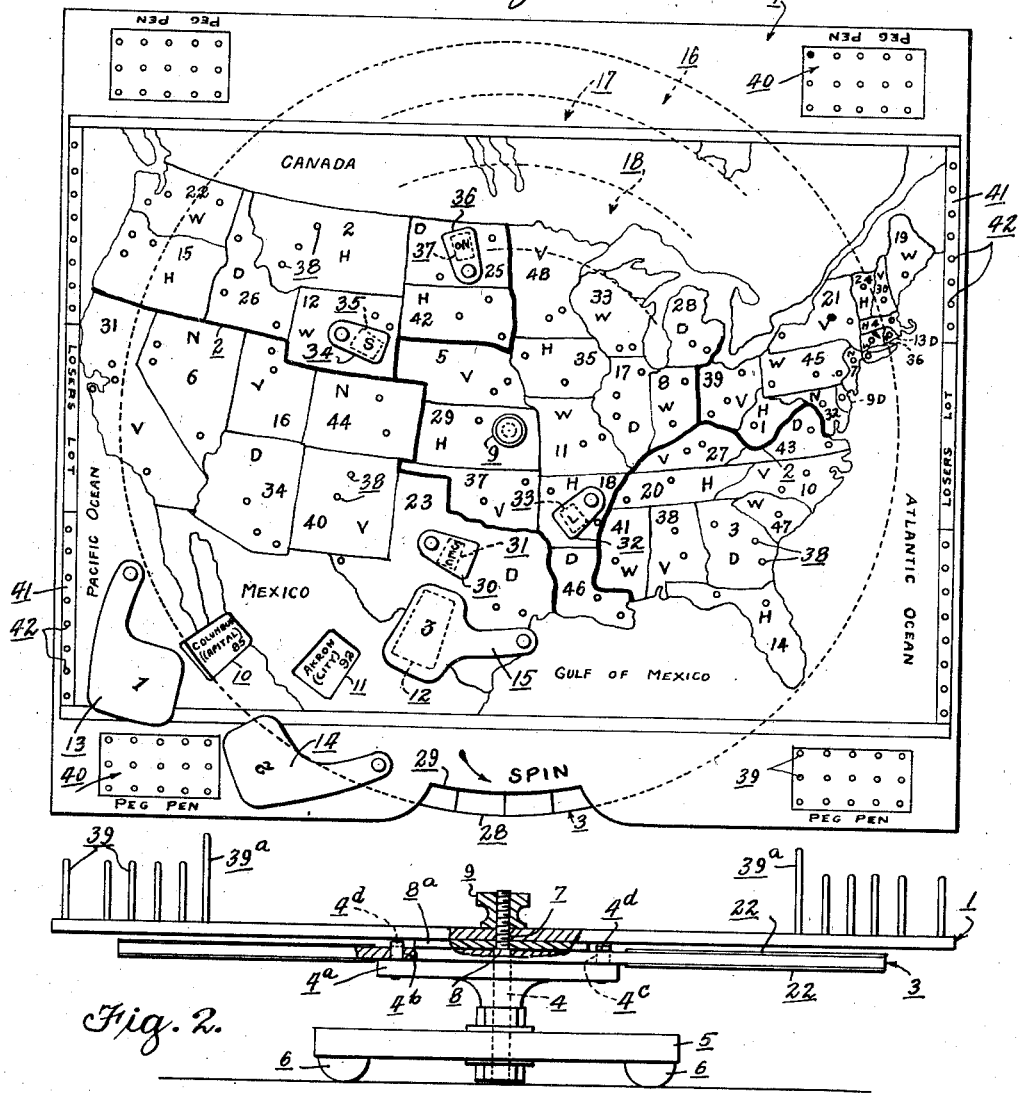
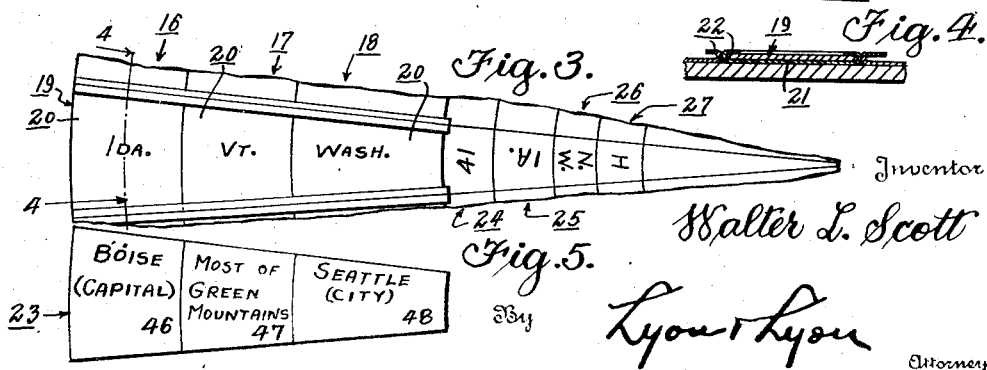

Patented Oct. 31, 1939

2,177,790

UNITED STATES PATENT OFFICE 2,177,790

EDUCATIONAL GAME

Walter L. Scott, Long Beach, Calif.

Application July 29, 1938, Serial No. 221,986

9 Claims. (Cl. 35—74)

This invention relates to a game board, which is intended to give amusement to the players, and at the same time to have educational effects.

The general object of the invention is to provide a game apparatus of simple construction, capable of being operated in such a way as to indicate a problem or question to a player whose turn it is, and to provide simple means for indicating the accuracy of the player's answer to the problem or question indicated.

In practicing the invention, it preferably includes a relatively movable member, for example, a disc, the surface of which carries problems or questions, any one of which is presented by chance to a player at an indicating point when the disc is spun on its axis. The relatively movable member or disc is preferably concealed by a relatively fixed member preferably consisting of a chart or map, with division lines simulating border lines of foreign or domestic states or counties which, however, may be devoid of any legends indicating the names of the states or their principal cities, rivers, or other facts regarding the states.

One of the objects of the invention is to provide simple means for testing the accuracy of the player's knowledge of the names and corresponding location of the states, their principal cities, and other facts concerning the same.

A further object of the invention is to provide a game board of this kind, with means whereby a hint, or hints, may be given to a player through the medium of the game board where the player does not know the answer to the problem or question put to him in the play of the game.

Further objects of the invention will appear hereinafter.

The invention consists in the novel parts and combination of parts to be described hereinafter, all of which contribute to produce an efficient educational game.

A preferred embodiment of the invention is described in the following specification, while the broad scope of the invention is pointed out in the appended claims.

In the drawing:

Fig. 1 is a plan of the game apparatus embodying my invention.

Fig. 2 is a side elevation of the game apparatus illustrated in Fig. 1, but with certain parts broken away and shown partially in section to indicate details of the construction.

Fig. 3 is a fragmentary view and is a plan of a sector of the spinner disc.

Fig. 4 is a section taken about on the line 4—4 of Fig. 3, and further illustrating details of the construction.

Fig. 5 is a plan of a removable card, which may be employed for carrying legends employed in the game.

Before proceeding to a more detailed description of the invention, it should be stated that in the preferred embodiment of the invention, it involves the employment of a spinner which cooperates with a relatively fixed member to indicate by chance, a legend on the spinner. The fixed member may be in the form of a globe or cylinder, the outer surface of which is formed into a map representing different foreign countries, or States of the United States; or counties of a State in which the players reside. In practice, however, I prefer to employ a flat map representing a country, and this map conceals a spinner disc. The map is preferably carried on a board having one or more indicating points at which legends on the spinner can be read. These legends indicate a problem to the player, that must be answered by the player. The question or problem suggested may be more or less simple, or more or less difficult, depending upon whether the players are children or adults. In the present instance, the invention is described as applied to a map of the United States, the boundaries of the States being represented, but the names of the States being omitted. In addition to this, the map may have indicated localities corresponding to the capital city, principal city, noted resorts, or physical characteristics, such as lakes and rivers.

In order to provide means for indicating the grade of the player's knowledge of the facts concerning the States, the board is provided with means whereby a player who cannot answer the question, may receive one or more hints from the board; but his possible score is, when receiving such hints, proportionally lower in playing the game than if he had known beforehand and stated correctly, the answer to the indicated problem. In order to accomplish this, I prefer to employ a plurality of tallies corresponding to each player. If a player, when his turn comes, answers a problem correctly, he is permited to dispose of a certain number of tallies in accordance with the rules of the game. In other words, the disposition of these tallies depends upon the accuracy of the player's knowledge of the facts that should be elicited by the suggested problem.

While the invention may be practiced with this game apparatus in such a way that the game will have different specific objects, in the present instance, the game is described as having an object of placing a line of tallies in adjoining States completely across the United States, and the player who accomplishes this first is the winner of the game. The scores of the players, however, are determined by other considerations which, in turn, depend upon the accuracy of the player in answering the problems indicated to him.

If a map of a State showing counties is not well adapted for establishing a line of pegs across it, it may be made the object of the game for the player to get all of his pegs placed on the map before any other player.

In order to provide points at which different problems can be indicated to the player, the board is preferably provided with a plurality of windows which are normally closed by movable covers. These windows are in line with different problem zones on the disc, and in playing the game a player must answer problems indicated in the different problem zones, in rotation.

Referring more particularly to the parts of the apparatus, 1 indicates a board, the surface of which is provided with division lines that divide the board into areas preferably of distinctive colors or shading to indicate the relative location of the states. In the present instance, the map represents the United States but, of course, if desired, the map could represent the states of Europe, Asia, or any other continent; or could represent any State of the United States divided into areas representing counties of the State. The complete map is preferably divided by means of heavy lines 2 into different sections including a southeastern section, a central section, a northeastern section, a northwestern section, and a southwestern section. In addition to this, each State preferably has a capital letter marked thereupon, and also a number. These letters are not individual to each State, but several States may have the same letter. No State, however, has the same number as any other State. Behind or below the board 1, I provide a spinner preferably in the form of a disc 3, said disc being mounted for rotation on its central axis and preferably on a center bolt 4 that projects up from a small stand or plate 5, the under side of which may be provided with small soft pads or feet 6, to enable the device to rest on the table top without scratching it. The board 1 has a central opening 7 (see Fig. 2), which enables it to be set down over the center pin 4, and the upper end of this bolt or pin 4 is formed with a shoulder 8. A center plate 8a is threaded onto the pin 4 down to the shoulder 8. This plate 8a supports the board 1. A thumb nut 9 is screwed down onto the threads of the bolt and holds the map on the center bolt.

The board 1 is preferably provided with one or more windows 10, 11, and 12. The windows 10 and 11 in Fig. 1, are represented in their open positions, their covers 13 and 14 being represented as shoved to one side. The window 12 is represented in dotted lines because its cover 15 is in place over it. These covers 13, 14 and 15 are numbered 1, 2, and 3, respectively, on the board, and in playing the game, a player for his first turn may move the cover numbered "1" aside to display the problem presented to him, and in another part of the game he would be required to use the window 11, and later on the window 12. In this way each player rotates on these windows so that he will have to answer problems presented in all three of the problem zones. In the present instance, there are three of these problem zones indicated respectively by the numbers 16, 17, and 18, (see Figs. 1 and 3). These zones are arcuate bands preferably extending completely around the disc, and these zones are divided into sectors or divisions, such as the sectors 19 (see Fig. 3), each sector carrying a division 20 that carries a legend; for example, as illustrated in Fig. 3, the zone 16 carries the abbreviation "Ida." indicating the State of Idaho; the next zone 17 carries the legend "Vt." indicating the State of Vermont; and the innermost zone 18 carries the legend "Wash." indicating the State of Washington. These three State abbreviations are placed here as guides, so players can place directly over them, problems which refer to these three States and which, therefore, have for their answers these three States. Other legends involving prepared problems may be placed over these legends calling for answers involving further knowledge of facts respecting these States.

Furthermore, if desired, insertable cards may be used to carry legends, slid into position on a plate 21, said plate having inturned flanges 22 to retain the card (see Fig. 4). In addition to legends indicating the names of States, other cards could be provided such as the card 23, which may carry the names of cities or mountains in different States; for example, in Fig. 5, the legend "Boise" is represented at the left with the word (Capital), thereby indicating the problem or question, "Of what State is Boise the capital?" The legend "Seattle" with the word (City) thereby, puts the question, "Of what State is Seattle a city?" The other legend is "Most of Green Mountains", of course, referring to that State in which most of the Green Mountains are located.

The three windows 10, 11, and 12, referred to above, are located in line with the three zones 16, 17 and 18.

Another zone 24 (Fig. 3), carries numbers such as the number 41, that corresponds to the State of Mississippi, and is the answer to another problem. The zone 25 carries abbreviations of the names of States constituting answers to problems found elsewhere on the board.

In addition to the problem zones 16, 17 and 18, the disc is provided with a plurality of hint zones 26 and 27 (Fig. 3). The use of the hint zones will now be described.

Suppose that the player has spun the spinning disc by engaging its edge 28 with his fingers at the deep notch 29 in the board where this edge is exposed; and suppose that the disc has stopped in a position such that the word "Boise" (capital) is exposed with the number 46. This number 46 is not concerned with the present problem and is merely a problem number. If the player admits that he does not know the State of which Boise is the capital, he is permitted to take a hint from the board. In order to do this he may raise a flexible flap 30 (see Fig. 1), which flap bears the abreviation "Sec." and when this flap is raised, a peep hole 31 under the flap will expose an abbreviation of the section of the country in which Idaho is located. In other words, it would expose the letters "N. W." indicating that it is in the Northwestern section of the United States. This gives the player a hint which he may act upon, and he may immediately know the name of the State required for the correct answer. If he requires a further hint, this would involve giving him the letter of the State, and he would get this information by raising the flap 32 marked with a capital "L", covering the peep hole 33. This would expose the letter of the State, which letter is "D". This, of course, does not give the actual location of the State to the player, as there are quite a number of States bearing the letter "D". It does, however, give him an opportunity to select the State of this group which he considers is the proper State to answer the question.

If the player still cannot decide on the State after this second hint, he can obtain further information from the board by lifting the flap 34 that is marked "S", and it is located over the peep hole 35. If this flap is raised, it will expose the abbreviation of the State of Idaho, which is the correct answer. Furthermore, if desired, the flap 36 could be raised to open the peep hole 37, beneath which the number 26 corresponding to "Idaho" would be indicated. This flap bears the abbreviation "No." indicating the number of the State.

Suitable means is provided for keeping a tally on the players to indicate whether the player answered the question immediately, or whether he required any hints. Each State is provided with a plurality of sockets 38 corresponding in position to the capital and principal cities, or points of interest in the State. When a player has answered a problem correctly without any hints and without looking at the answer, he is entitled to three tallies, and in playing the game he must place one of these tallies in the State which was involved in his answer, and he may place each of the other two tallies in sockets in adjoining States. In the present instance, the object of the game is for a player to have a complete line of adjoining States extending across the continent, each State having at least one pin in it. As stated above, the tallies are preferably in the form of pins 39, and these pins are carried in a set of sockets 40 corresponding to each player. These sets of sockets 40 are located at each corner of the board, and are labeled respectively, with the label "Peg pen". There are fifteen sockets, and the pins corresponding to each player have a distinctive color; for example, yellow, white, red, and black.

In addition to this there is a point on the board at which pins are received, that have been placed on the board properly by the players, but which have to be removed as penalties. These lost pins are placed at a marked strip 41 adjacent to the player's corresponding peg pin, the said strips 41 being provided with sockets 42 to receive the pins.

In addition to the regular pins 39, each player has a special pin 39a which is of abnormal length, and which may be used under certain circumstances, as provided for by the rules of the game.

It will be evident that in addition to simple facts about the State, such as the capital, principal city, mountains, etc., other information could be impressed upon the minds of players; for example, products for which a State is celebrated. The spinner disc could be provided in the problem zone with a legend such as "Corn", and the player to which the legend was indicated, would be obliged to say what State is the celebrated corn State of the Union. Other valuable information, such as the location of caves such as Mammoth Cave, Luray Cave, or other points of interest, could be placed in the problem zone. Other information such as the population of cities, could be also included; in fact, any facts relating to the States or cities, and which should be known by a well educated person, could be included in the game.

The disc 3 could have a certain type of information on its upper face, and a different type of information or legends on its lower face, and the disc could be made reversible; for example, the problem zone could carry the legend "Lowest point in the United States". This, of course, is a point in Death Valley, in California. Other points of interest could be placed in the problem zone, such as Grand Canyon (National Park), Baker's Creek Battlefield, Largest Anthracite Coal Deposits; or places of historical interest could be placed in the problem zone, such as First White Child Born in America; Kitty Hawk, a historical location at which the first flight of an airplane occurred. It will be evident that in playing this game, much information not only of a geographical nature, can be impressed upon the minds of the players, and at the same time, this will be accomplished while the players are amused and competing with each other to win the game.

The disc 3 is preferably detachably mounted on a rotary head 4a carried on the center bolt 4 (see Fig. 2). For this purpose, near the center of the disc it may be provided with two short arcuate slots 4b and 4c, which receive catches secured on the head 4a. These catches would have circumferential projections 4d to extend over the edges of the slots, and thereby hold the disc on the rotary head.

While various games may be played on this game board, it is preferably played with rules which operate to permit each player who makes a correct answer, to take three tally pins from a peg pen, and place them in the correct State involved in his answer, and in two adjoining States, endeavoring to take States that will cooperate in making an unbroken line of adjacent States extending completely across the continent. If a player found it necessary to use one hint in arriving at the correct answer, he would only be entitled to the placing of two pins on the map; and only one pin if he required two hints. In case a player selects the wrong State or the wrong capital city, or otherwise misses the answer, and if he has done this without any hints, then he must remove one of his own pegs from the map and place it in his loser's lot strip 41.

When the game has been won by one of the players having placed all of his pegs on the board, or a complete line of pegs in touching States extending completely across the United States, he scores 100 points, and he may also add 10 points to his score for each peg remaining in his opponents' peg pens. The loser may also add 10 points to his score for each of his own pegs remaining in his own loser's lot; that is to say, in the strip 41.

As an aid to beginners, a strip may be provided to the players, giving all of the states in alphabetical order with their corresponding numbers following the same; and the reverse side of the strip may give the numbers of the states in regular order, followed by the names of the states. These strips are of great convenience and assistance to children in playing the game.

When two divisions appear in one of the windows, that division should be selected that has the greater area under the window.

When two, four, or any other even number of persons are playing, the first player takes his problem from the window marked "No. 1", the second player takes his problem from the window "No. 2" etc. In this way, since there are an even number of players and an odd number of windows from which to take the problems, a rotation effect is developed that prevents a player from getting the same problem that a previous player had. When an odd number of players are playing, for example, three players, all three players take their first problem from window "No. 1", their second problem from window "No. 2", their third problem from window "No. 3" and their fourth problem from window "No. 1", etc.

There is no objection to the same problem coming to the same person from time to time, because a player may forget an answer and this constant repetition teaches him the fact taught by the game. It can hardly occur when an even number of players are playing, that the same problem would be presented successively to different players because each successive problem is taken from a different window. That is more apt to happen when an odd number of players are playing, but even then, the chances are somewhat remote that the same problem would be confronted twice in a short space of time.

Although it has been suggested to spin the spinner disc, it is obvious that if desired, the spinner disc can be advanced step by step so as to bring successive adjacent portions of the edge of the spinner into view.

It is understood that the embodiment of the invention described herein is only one of the many embodiments this invention may take, and I do not wish to be limited in the practice of the invention, nor in the claims, to the particular embodiment set forth.

What I claim is:

1. In a game apparatus, the combination of a board having a map upon the upper face thereof with lines thereon dividing the same into different divisions, said divisions having characteristic features indicated thereupon at certain localities, the facts in regard to which should be known by educated players, and associated by them with the said corresponding divisions, a concealed spinner disc having problem divisions thereon with legends disposed in circular zones of different diameter, and corresponding to the said different divisions and the said different localities on the board, means on the board to cooperate with said spinner disc to indicate to a player a problem regarding any one of said divisions or any one of said localities in said divisions on the board, thereby giving an opportunity to the player to state the answer to the problem suggested at the indicating point on the spinner disc.

2. In a game apparatus, the combination of a board having a map upon the upper face thereof with lines thereon dividing the same into different divisions, said divisions having characteristic features indicated thereupon at certain localities, the facts in regard to which should be known by educated players, and associated by them with the said corresponding divisions, a concealed spinner disc having problem divisions thereon with legends disposed in circular zones of different diameter, and corresponding to the said different divisions and the said different localities on the board, means including windows with movable covers in line with the different zones to cooperate with said spinner disc to indicate to a player a problem regarding any one of said divisions or any one of said localities in said divisions on the board, thereby giving an opportunity to the player to state the answer to the problem suggested at the indicating point on the spinner disc.

3. In a game apparatus, the combination of a board having a map upon the upper face thereof with lines thereon dividing the same into different divisions, said divisions having characteristic features indicated thereupon at certain localities, the facts in regard to which should be known by educated players, and associated by them with the said corresponding divisions, a spinner disc mounted to rotate on an axis, concealed by the board and having a zone of problem divisions thereon with legends disposed in circular zones of different diameter, and corresponding to the said divisions on the face of the board and the said different localities on the board, said problem divisions having legends, means including windows with movable covers in line with the zone to cooperate with the spinner disc to indicate to a player a problem suggested by a legend regarding any one of the divisions or localities on the board, and giving an opportunity to the player to answer the problem suggested at the indicating point on the spinner disc, groups of tally pins, each group of pins being characteristically marked to correspond to a certain player, said board having a plurality of sockets at different locations on the map in which said pins may be placed by the players, to indicate the winner.

4. In a game apparatus, the combination of a board having a map of a country upon the upper face thereof with lines thereon dividing the map into different divisions representing States, and having the location of characteristic features of the States indicated thereon at certain localities, the related facts of which should be known by expert players and associated by them with the said corresponding States, a spinner disc concealed below the said board having problem divisions thereon with legends disposed in circular zones of different diameter, and corresponding to the said different States and the said different localities on the board, said board having an indicator opening therethrough with a movable cover, disposed over said zones respectively through which a portion of the spinner disc may be seen when the cover is open, to indicate to a player a problem regarding any one of said States or any one of said localities on the board, and giving an opportunity to the player to answer the problem suggested at the indicated point on the spinner disc, a characteristic group of movable tallies corresponding to each player for use on the board, and means at different points of the countries represented on the map for receiving the said tallies at the will of the players enabling the successful player to establish a line of his own pins in adjacent countries.

5. In a game apparatus, the combination of a board having a map of a country upon the upper face thereof with lines thereon dividing the map into different divisions representing States, and having the location of characteristic features of the States indicated thereon at certain localities, the related facts of which should be known by expert players and associated by them with the said corresponding States, a spinner disc concealed below the said board having problem divisions thereon with legends disposed in circular zones of different diameter, and corresponding to the said different States and the said different localities on the board, said board having an indicator opening therethrough corresponding to each problem zone, with a movable cover therefor, through which a portion of the spinner disc may be seen when the cover is open, to indicate to a player a problem regarding any one of said States or any one of said localities on the board, and giving an opportunity to the player to answer the problem suggested at the indicated point on the spinner disc, said disc having an arcuate hint zone thereon with divisions bearing legends for giving information to the player to assist him in answering a problem, said board having a peep hole therein in line with said hint zone and through which the divisions on the said hint zone may be seen, and movable means for normally closing the peep hole.

6. In a game apparatus, the combination of a board having a map of a country upon the upper face thereof, with lines thereon dividing the map into different areas representing States, and having the location of characteristic features of the different States indicated thereon at certain localities, the facts regarding which should be known to expert players and associated by them with the said corresponding States, a spinner disc concealed below the said board having a problem zone thereon corresponding to the said different States and the said different localities, said board having a plurality of windows therethrough, each having a movable cover through which a portion of the said zone may be seen when the cover is open, said problem zone having legends to indicate to a player a problem regarding any one of said States or any one of said localities on the board, and giving an opportunity to the player to answer the indicated problem, a plurality of hint zones located at different distances from the axis, on said spinner disc, each spinner zone having divisions with means thereon for giving hints to assist a player in answering the suggested problem, said board having peep holes in line respectively with the said hint zones, and movable covers for normally covering the said peep holes.

7. In a game apparatus, the combination of a board having a map of a country upon the upper face thereof with lines thereon dividing the map into States, and having the location of characteristic features of the States indicated thereon at certain localities, the facts of which should be known to expert players, and associated by them with the said corresponding States, a spinner disc concealed below the said board for rotation on a central axis, said disc having problem zones thereon with legends corresponding to the facts concerning said different States and the said different localities on the board, said board having windows therethrough in line with the different problem zones, with movable covers through which one of the said legends may be read when the window in line with the same is open, thereby indicating a problem to a player regarding any one of the said States or any one of the said localities on the board, and giving an opportunity to the player to answer the indicated problem, said disc having a plurality of hint zones thereon with legends giving hints as to the answer of corresponding problems indicated at the indicating point on the spinner disc, said board having peep holes in line with the different hint zones with movable covers normally closing the same.

8. In a game apparatus, the combination of a board having a map of a country upon the upper face thereof with lines thereon dividing the map into different divisions representing States, and having the location of characteristic features of the States indicated thereon at certain localities, the related facts of which should be known by expert players and associated by them with the said corresponding States, a spinner disc concealed below the said board having problem divisions thereon with legends disposed in circular zones of different diameter, and corresponding to the said different States and the said different localities on the board, said board having an indicator opening therethrough corresponding to each problem zone, with a movable cover therefor, through which a portion of the spinner disc may be seen when the cover is open, to indicate to a player a problem regarding any one of said States or any one of said localities on the board, and giving an opportunity to the player to answer the problem suggested at the indicated point on the spinner disc, said disc having an arcuate hint zone thereon on a different radius from said problem zones, with divisions bearing legends for giving information to the player to assist him in answering a problem, said board having a peep hole therein with a movable cover in line with said hint zone and through which the divisions on the said hint zone may be seen.

9. In a game apparatus, the combination of a relatively fixed member having a map upon the outer face thereon with lines thereon dividing the same into different States, said States having characteristic features indicated thereupon at certain localities, the facts in regard to which should be known by expert players and associated by them with the said corresponding States, a spinner concealed by the said relatively fixed member having problem divisions thereon composed of legends disposed in circular zones and corresponding to the said different States and the said different localities on the said relatively fixed member, means to cooperate with said spinner to indicate to a player a problem regarding any one of said States or any one of said localities in said States on the relatively fixed member, thereby giving an opportunity to the player to state the answer to the problem suggested at the indicating point on the spinner, and a plurality of distinct sets of tallies, each set corresponding to a player, said board having sockets in the different States to receive the distinctive pins of the players.

WALTER L. SCOTT.